(12) United States Patent
Kenney et al.

(10) Patent No.: US 11,422,822 B2
(45) Date of Patent: Aug. 23, 2022

(54) MULTI-CHANNEL DATA PATH CIRCUITRY

(71) Applicant: Apple Inc., Cupertino, CA (US)

(72) Inventors: Robert D. Kenney, Austin, TX (US); Jason N. Dale, Austin, TX (US)

(73) Assignee: Apple Inc., Cupertino, CA (US)

( * ) Notice: Subject to any disclaimer, the term of this patent is extended or adjusted under 35 U.S.C. 154(b) by 82 days.

(21) Appl. No.: 16/870,330

(22) Filed: May 8, 2020

(65) Prior Publication Data

US 2021/0349725 A1    Nov. 11, 2021

(51) Int. Cl.
| | | |
|---|---|---|
| *G06F 9/38* | (2018.01) | |
| *G06T 1/20* | (2006.01) | |
| *G06F 9/54* | (2006.01) | |
| *G06F 15/80* | (2006.01) | |

(52) U.S. Cl.
CPC .......... *G06F 9/3869* (2013.01); *G06F 9/3822* (2013.01); *G06F 9/3842* (2013.01); *G06F 9/3887* (2013.01); *G06F 9/544* (2013.01); *G06F 15/8007* (2013.01); *G06T 1/20* (2013.01)

(58) Field of Classification Search
CPC .................................................... G06F 9/3869
See application file for complete search history.

(56) References Cited

U.S. PATENT DOCUMENTS

| | | | |
|---|---|---|---|
| 9,600,288 B1* | 3/2017 | Potter | G06F 9/3887 |
| 2006/0206692 A1* | 9/2006 | Jensen | G06F 9/3861 |
| | | | 712/215 |
| 2012/0278595 A1* | 11/2012 | Indukuru | G06F 9/3855 |
| | | | 712/219 |
| 2018/0114290 A1 | 4/2018 | Paltashev et al. | |
| 2019/0122415 A1 | 4/2019 | S. | |
| 2019/0206017 A1 | 7/2019 | Lin et al. | |

* cited by examiner

*Primary Examiner* — Michael J Metzger
(74) *Attorney, Agent, or Firm* — Kowert, Hood, Munyon, Rankin & Goetzel, P.C.; Michael B. Davis; Dean M. Munyon

(57) ABSTRACT

Techniques are disclosed relating to sharing datapath circuitry among multiple SIMD groups. In some embodiments, pipeline circuitry is configured to perform operations specified by instructions of first and second assigned SIMD groups. The pipeline circuitry may include first and second front-end circuitry configured to decode instructions of the respective SIMD groups. The pipeline circuitry may include shared execution circuitry configured to perform operations specified by the first and second assigned SIMD groups and arbitration circuitry configured to select an instruction from among at least the first and second front-end circuitry for assignment to the shared execution circuitry in a current cycle. The arbitration circuitry may select an instruction based on one or more of: stall counts, whether available instructions are being speculatively executed, whether ones of available instructions target a particular portion of the shared execution circuitry, numbers of execution cycles, and SIMD group ages.

18 Claims, 8 Drawing Sheets

MULTI-CHANNEL DATA PATH CIRCUITRY

BACKGROUND

Technical Field

This disclosure relates generally to computer processors and more particularly to sharing datapath circuitry among multiple SIMD groups.

Description of the Related Art

Processors such as graphics processing units (GPUs) typically include datapath circuitry configured to perform certain operations, e.g., using single-instruction multiple-data (SIMD) techniques. Traditionally, datapath circuitry is dedicated to perform operations for a given currently-assigned thread or SIMD group, although threads may share some resources such as general purpose registers.

Figure 1A:
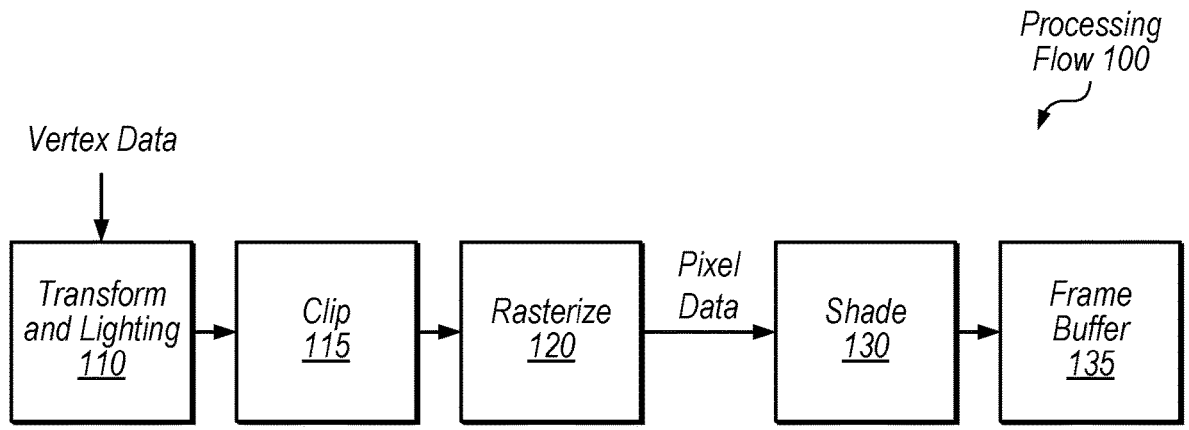
FIG. 1A is a diagram illustrating an overview of example graphics processing operations, according to some embodiments.

This specification includes references to various embodiments, to indicate that the present disclosure is not intended to refer to one particular implementation, but rather a range of embodiments that fall within the spirit of the present disclosure, including the appended claims. Particular features, structures, or characteristics may be combined in any suitable manner consistent with this disclosure.

Within this disclosure, different entities (which may variously be referred to as "units," "circuits," other components, etc.) may be described or claimed as "configured" to perform one or more tasks or operations. This formulation—[entity] configured to [perform one or more tasks]—is used herein to refer to structure (i.e., something physical, such as an electronic circuit). More specifically, this formulation is used to indicate that this structure is arranged to perform the one or more tasks during operation. A structure can be said to be "configured to" perform some task even if the structure is not currently being operated. A "shader processor configured to execute a shader program" is intended to cover, for example, a circuit that performs this function during operation, even if the circuit in question is not currently being used (e.g., power is not connected to it). Thus, an entity described or recited as "configured to" perform some task refers to something physical, such as a device, circuit, memory storing program instructions executable to implement the task, etc. This phrase is not used herein to refer to something intangible.

The term "configured to" is not intended to mean "configurable to." An unprogrammed FPGA, for example, would not be considered to be "configured to" perform some specific function, although it may be "configurable to" perform that function. After appropriate programming, the FPGA may then be configured to perform that function.

Reciting in the appended claims that a structure is "configured to" perform one or more tasks is expressly intended not to invoke 35 U.S.C. § 112(f) for that claim element. Accordingly, none of the claims in this application as filed are intended to be interpreted as having means-plus-function elements. Should Applicant wish to invoke Section 112(f) during prosecution, it will recite claim elements using the "means for" [performing a function] construct.

As used herein, the term "based on" is used to describe one or more factors that affect a determination. This term does not foreclose the possibility that additional factors may affect the determination. That is, a determination may be solely based on specified factors or based on the specified factors as well as other, unspecified factors. Consider the phrase "determine A based on B." This phrase specifies that B is a factor that is used to determine A or that affects the determination of A. This phrase does not foreclose that the determination of A may also be based on some other factor, such as C. This phrase is also intended to cover an embodiment in which A is determined based solely on B. As used herein, the phrase "based on" is synonymous with the phrase "based at least in part on."

Further, as used herein, the terms "first," "second," "third," etc. do not necessarily imply an ordering (e.g., temporal) between elements. For example, a referring to a "first" graphics operation and a "second" graphics operation does not imply an ordering of the graphics operation, absent additional language constraining the temporal relationship between these operations. In short, references such as "first," "second," etc. are used as labels for ease of reference in the description and the appended claims.

DETAILED DESCRIPTION

Graphics Processing Overview

Referring to FIG. 1A, a flow diagram illustrating an example processing flow 100 for processing graphics data is shown. In some embodiments, transform and lighting procedure 110 may involve processing lighting information for vertices received from an application based on defined light source locations, reflectance, etc., assembling the vertices into polygons (e.g., triangles), and/or transforming the polygons to the correct size and orientation based on position in a three-dimensional space. Clip procedure 115 may involve discarding polygons or vertices that fall outside of a viewable area. Rasterize procedure 120 may involve defining fragments within each polygon and assigning initial color values for each fragment, e.g., based on texture coordinates of the vertices of the polygon. Fragments may specify attributes for pixels which they overlap, but the actual pixel attributes may be determined based on combining multiple fragments (e.g., in a frame buffer) and/or ignoring one or more fragments (e.g., if they are covered by other objects). Shade procedure 130 may involve altering pixel components based on lighting, shadows, bump mapping, translucency, etc. Shaded pixels may be assembled in a frame buffer 135. Modern GPUs typically include programmable shaders that allow customization of shading and other processing procedures by application developers. Thus, in various embodiments, the example elements of FIG. 1A may be performed in various orders, performed in parallel, or omitted. Additional processing procedures may also be implemented.

Figure 1B:
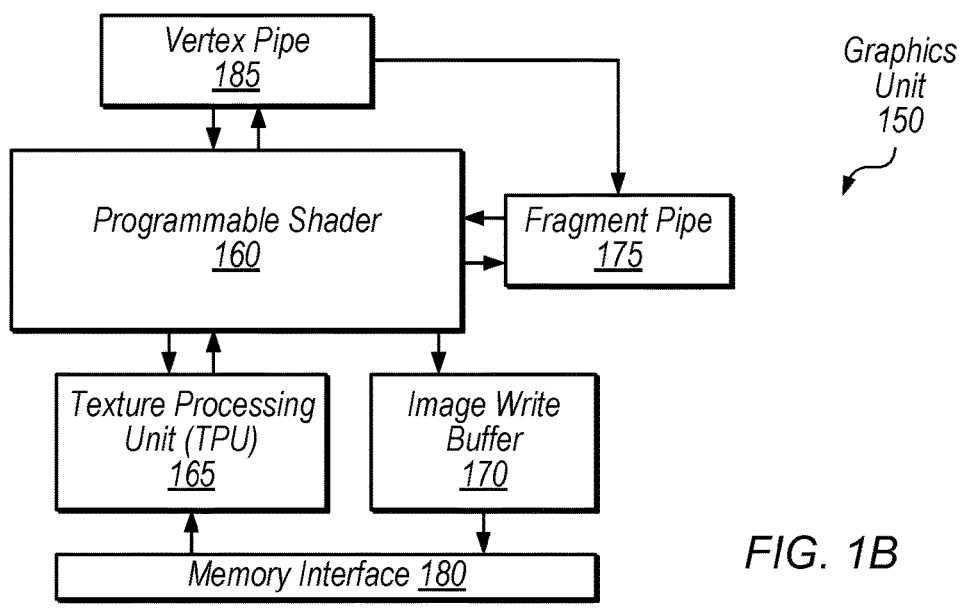
FIG. 1B is a block diagram illustrating an example graphics unit, according to some embodiments.

Referring now to FIG. 1B, a simplified block diagram illustrating a graphics unit 150 is shown, according to some embodiments. In the illustrated embodiment, graphics unit 150 includes programmable shader 160, vertex pipe 185, fragment pipe 175, texture processing unit (TPU) 165, image write unit 170, and memory interface 180. In some embodiments, graphics unit 150 is configured to process both vertex and fragment data using programmable shader 160, which may be configured to process graphics data in parallel using multiple execution pipelines or instances.

Vertex pipe 185, in the illustrated embodiment, may include various fixed-function hardware configured to process vertex data. Vertex pipe 185 may be configured to communicate with programmable shader 160 in order to coordinate vertex processing. In the illustrated embodiment, vertex pipe 185 is configured to send processed data to fragment pipe 175 and/or programmable shader 160 for further processing.

Fragment pipe 175, in the illustrated embodiment, may include various fixed-function hardware configured to process pixel data. Fragment pipe 175 may be configured to communicate with programmable shader 160 in order to coordinate fragment processing. Fragment pipe 175 may be configured to perform rasterization on polygons from vertex pipe 185 and/or programmable shader 160 to generate fragment data. Vertex pipe 185 and/or fragment pipe 175 may be coupled to memory interface 180 (coupling not shown) in order to access graphics data.

Programmable shader 160, in the illustrated embodiment, is configured to receive vertex data from vertex pipe 185 and fragment data from fragment pipe 175 and/or TPU 165. Programmable shader 160 may be configured to perform vertex processing tasks on vertex data which may include various transformations and/or adjustments of vertex data. Programmable shader 160, in the illustrated embodiment, is also configured to perform fragment processing tasks on pixel data such as texturing and shading, for example. Programmable shader 160 may include multiple sets of multiple execution pipelines for processing data in parallel.

TPU 165, in the illustrated embodiment, is configured to schedule fragment processing tasks from programmable shader 160. In some embodiments, TPU 165 is configured to pre-fetch texture data and assign initial colors to fragments for further processing by programmable shader 160 (e.g., via memory interface 180). TPU 165 may be configured to provide fragment components in normalized integer formats or floating-point formats, for example. In some embodiments, TPU 165 is configured to provide fragments in groups of four (a "fragment quad") in a 2×2 format to be processed by a group of four execution pipelines in programmable shader 160.

Image write unit (IWU) 170, in some embodiments, is configured to store processed tiles of an image and may perform operations to a rendered image before it is transferred for display or to memory for storage. In some embodiments, graphics unit 150 is configured to perform tile-based deferred rendering (TBDR). In tile-based rendering, different portions of the screen space (e.g., squares or rectangles of pixels) may be processed separately. Memory interface 180 may facilitate communications with one or more of various memory hierarchies in various embodiments.

Overview of Pipeline with Shared Datapath Circuitry

Figure 2:
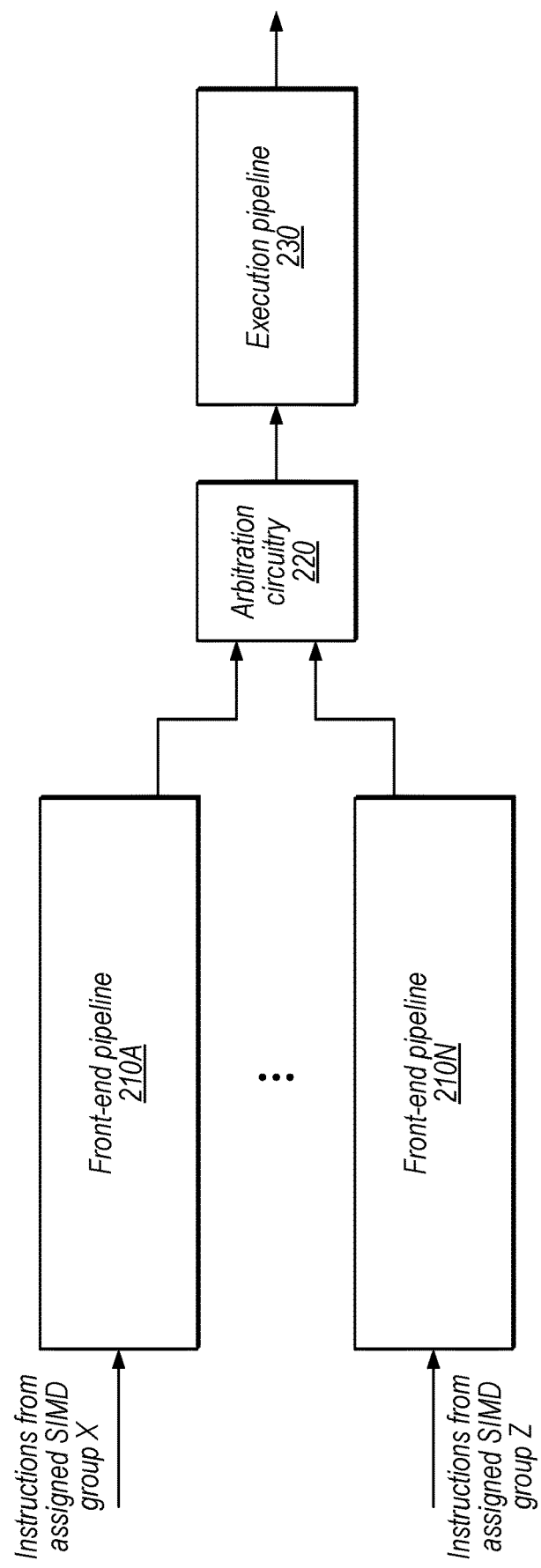
FIG. 2 is a block diagram illustrating example pipeline circuitry with a shared execution pipeline and multiple front-end pipelines assigned to different SIMD groups, according to some embodiments.

FIG. 2 is a block diagram illustrating example pipeline circuitry, according to some embodiments. In the illustrated embodiment, the pipeline circuitry includes multiple front-end pipelines 210A-210N, arbitration circuitry 220, and execution pipeline 230.

The term "SIMD group" is intended to be interpreted according to its well-understood meaning, which includes a set of threads for which processing hardware processes the same instruction in parallel using different input data for the different threads. Various types of computer processors may include sets of pipelines configured to execute SIMD instructions. For example, graphics processors often include programmable shader cores that are configured to execute instructions for a set of related threads in a SIMD fashion. Other examples of names that are often used for a SIMD group include: a clique, a wavefront, or a warp. A SIMD group may be a part of a larger thread group, which may be broken up into a number of SIMD groups based on the parallel processing capabilities of a processor. In some embodiments, each thread is assigned to a hardware pipeline that fetches operands for that thread and performs the specified operations in parallel with other pipelines for the set of threads. Note that processors may have a large number of pipelines such that multiple separate SIMD groups may also execute in parallel. In some embodiments, each thread has private operand storage, e.g., in a register file. Thus, a read of a particular register from the register file may provide the version of the register for each thread in a SIMD group.

Front-end pipelines 210A-210N may be dedicated to processing instructions for a currently-assigned SIMD group. Each front-end pipeline may include decode and hazard detection stages, for example. In the illustrated example, SIMD group X is currently assigned to front-end pipeline 210A and SIMD group Z is currently assigned to front-end pipeline 210N. The front-end pipelines 210 may correspond to different channels to which the GPU may assign SIMD groups, as discussed in detail below. In a given implementation, a certain number of channels may be available and the device may assign SIMD groups to channels as they become available (e.g., as they finish processing their previously-assigned SIMD group). In different pipeline embodiments, different numbers of channels may share an execution pipeline. In some embodiments, a SIMD group assigned to a channel stays assigned that channel until completion of the instructions in the SIMD group, in the absence of an event such as a context switch or a power loss.

Arbitration circuitry 220, in some embodiments, is configured to select an instruction for assignment to execution pipeline 230 in each cycle. Arbitration circuitry 220 may consider various types of available information for the next available instructions from the different front-end pipelines, including, without limitation: stall counts for available instructions, whether available instructions are being speculatively executed, whether ones of available instructions target a particular portion of the shared execution circuitry, numbers of execution cycles for available instructions, and ages of SIMD groups of available instructions, or any combination of these. These arbitration inputs and example arbitration logic are discussed in detail below.

Execution pipeline 230, in some embodiments, includes circuitry configured to perform operations specified by received instructions. In the illustrated embodiment, execution pipeline 230 is shared among multiple front-end pipelines 210. Execution pipeline 230 may include multiple different execution units, e.g., for integer operations, floating point operations, complex operations (e.g., square root, etc.) that may each use a certain number of stages to process a certain type of operation.

Depending on the instruction, execution pipeline 230 may have an exposed latency of 1 to N instructions, and a compiler may schedule instructions to attempt avoiding bubbles in the execution pipeline that may be caused by instruction dependencies. In some embodiments, arbitration circuitry 220 may use the execution latency of available instructions in selection. In some embodiments, arbitration circuitry 220 may use information indicating which of the execution units of execution pipeline 230 is targeted by a given instruction.

In some embodiments, arbitration circuitry 220 selecting from among multiple SIMD groups to use shared execution hardware may reduce or avoid pipeline bubbles, e.g., that the compiler may not be able to eliminate when compiling instructions in implementations with un-shared execution pipelines. In various embodiments, the disclosed techniques may advantageously improve processor performance or reduce overall power consumption.

The concept of "execution" is broad and may refer to 1) processing of an instruction throughout an execution pipeline (e.g., through fetch, decode, execute, and retire stages) and 2) processing of an instruction at an execution unit or execution subsystem of such a pipeline (e.g., an integer execution unit or a load-store unit). The latter meaning may also be referred to as "performing" the instruction. Thus, "performing" an add instruction refers to adding two or more operands to produce a result, which may, in some embodiments, be accomplished by a circuit at an execute stage of a pipeline (e.g., an execution unit). Conversely, "executing" the add instruction may refer to the entirety of operations that occur throughout the pipeline as a result of the add instruction. Similarly, "performing" a "load" instruction may include retrieving a value (e.g., from a cache, memory, or stored result of another instruction) and storing the retrieved value into a register or other location.

Note that various techniques are discussed herein in the context of graphics processors, but similar techniques may be used in other types of processors such as central processing units, co-processors, etc.

Detailed Pipeline Example

Figure 3:
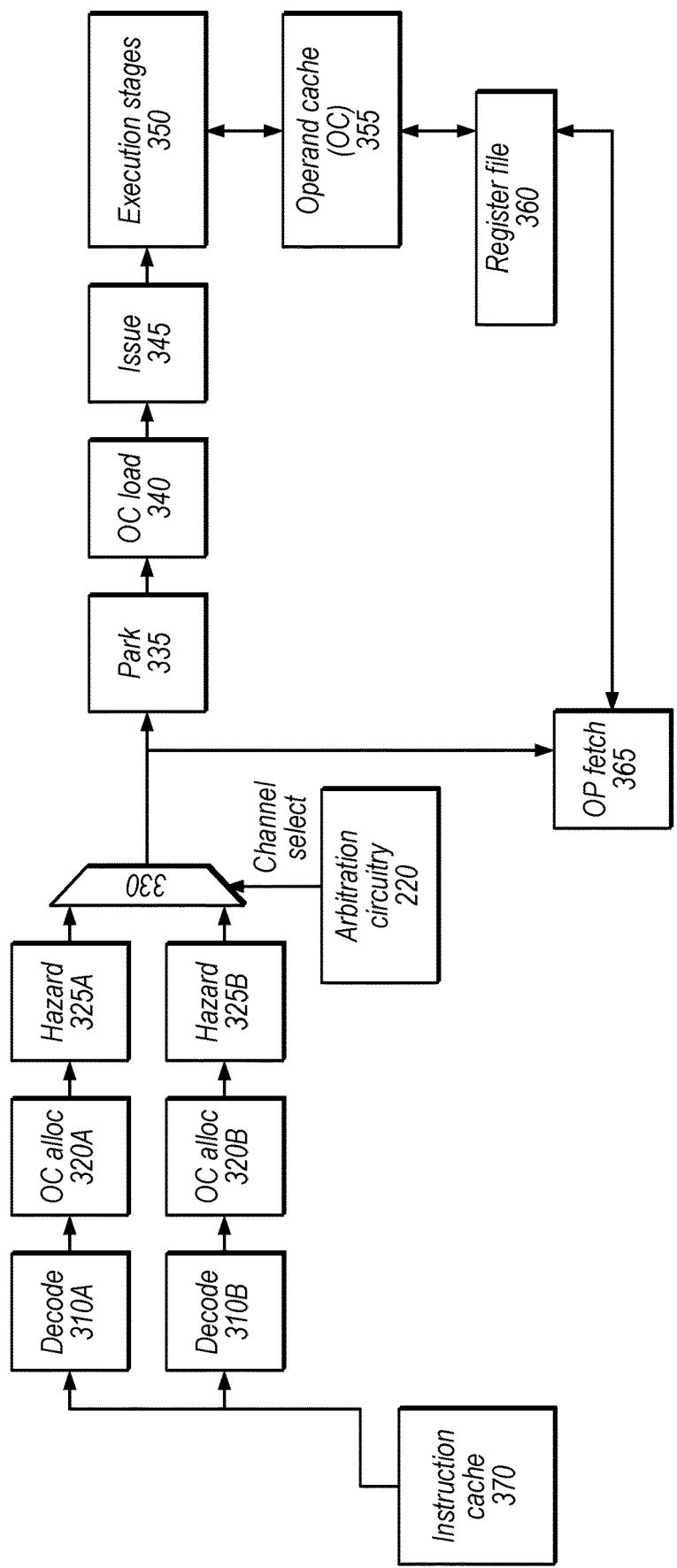
FIG. 3 is a block diagram illustrating a more detailed example of pipeline circuitry, according to some embodiments.

FIG. 3 is a block diagram illustrating a more detailed example of pipeline circuitry, according to some embodiments. In the illustrated embodiment, the pipeline circuitry includes decode stages 310A-310B, operand cache (OC) allocation stages 320A-320B, hazard stages 325A-325B, multiplexer (MUX) 330, park stage 335, OC load stage 340, issue stage 345, and execution stages 350. In the illustrated example, the processor also includes arbitration circuitry 220, operand cache 355, register file 360, operand fetch circuitry 365, and instruction cache 370. Note that the illustrated pipeline stages are included for purposes of explanation but are not intended to limit the scope of the present disclosure. Various stages may be omitted, added, replaced, or re-ordered in other embodiments.

Elements 310-325 are examples of the front-end pipelines 210 of FIG. 2. In the illustrated example, there are two front-end pipelines for purposes of explanation, but the disclosed arbitration circuitry may select instructions from any appropriate number of front-end pipelines in various embodiments.

Instruction cache 370, in the illustrated embodiment, is configured to cache instructions to be fetched for execution. Instruction cache 370 may include index, tag, and data fields for cached instructions. Instruction cache 370 may be a dedicated instruction cache but may be included in a cache/memory hierarchy that includes one or more levels that are shared for instructions and data. In some embodiments, fetch circuitry (not shown) is configured to retrieve instructions from instruction cache 370 for execution by the pipeline circuitry.

Decode stages 310, in some embodiments, are configured to decode retrieved instructions, which may include determining the operation specified by the instruction, determining locations of operands used by the instruction, etc. Decode stages 310 may generate one or more micro-operations for each received instruction. For example, a subset of complex instructions may be performed using multiple micro-operations while other instructions may be performed using a single micro-operation. In some embodiments, depending on the instruction, all of the micro-operations for the instruction may be selected sequentially, or the processor may allow selection of micro-operations from another front-end pipeline in between the micro-operations of a decoded instruction.

Operand cache allocation stages 320, in the illustrated embodiment, are configured to allocate entries in operand cache 355 for input and result operands of decoded instructions. In the illustrated embodiment, the operand cache 355 sits between register file 360 and execution stages 350, which may reduce power used to access operands when operands are re-used, for example. Allocating operand cache entries before they are actually needed may allow for a smaller operand cache which may also allow smaller operand cache addresses sizes, which may then be used for dependency checks (which may in turn reduce power consumption relative to checking longer addresses in the register file, for example).

Hazard stages 325, in the illustrated embodiment, are configured to detect dependencies (e.g., read after write (RAW) hazards, write after write (WAW) hazards, write after read (WAR) hazards, etc.) between executions executed for a given SIMD group. In some embodiments, a hazard stage 325 is configured to determine a stall count for each instruction when one or more uncovered dependencies are encountered. In some embodiments a "cycles until done" counter is used during operand cache allocation, e.g., for eviction selection. In some embodiments, hazard stages 325 are configured to use these counter values to determine a stall count per operand. Hazard stages 325 may then determine the stall count for a given instruction based on the maximum stall count of the operands of the instruction. The stall count may correspond to the number of cycles the current instruction will stall at the issue stage due to data dependency hazards on older instructions. The stall count may be decremented each cycle an instruction from that channel is not selected, as older instructions proceed in their execution. Note that the stall counts may be estimates or may be definitively determined, in various embodiments.

Figure 4:
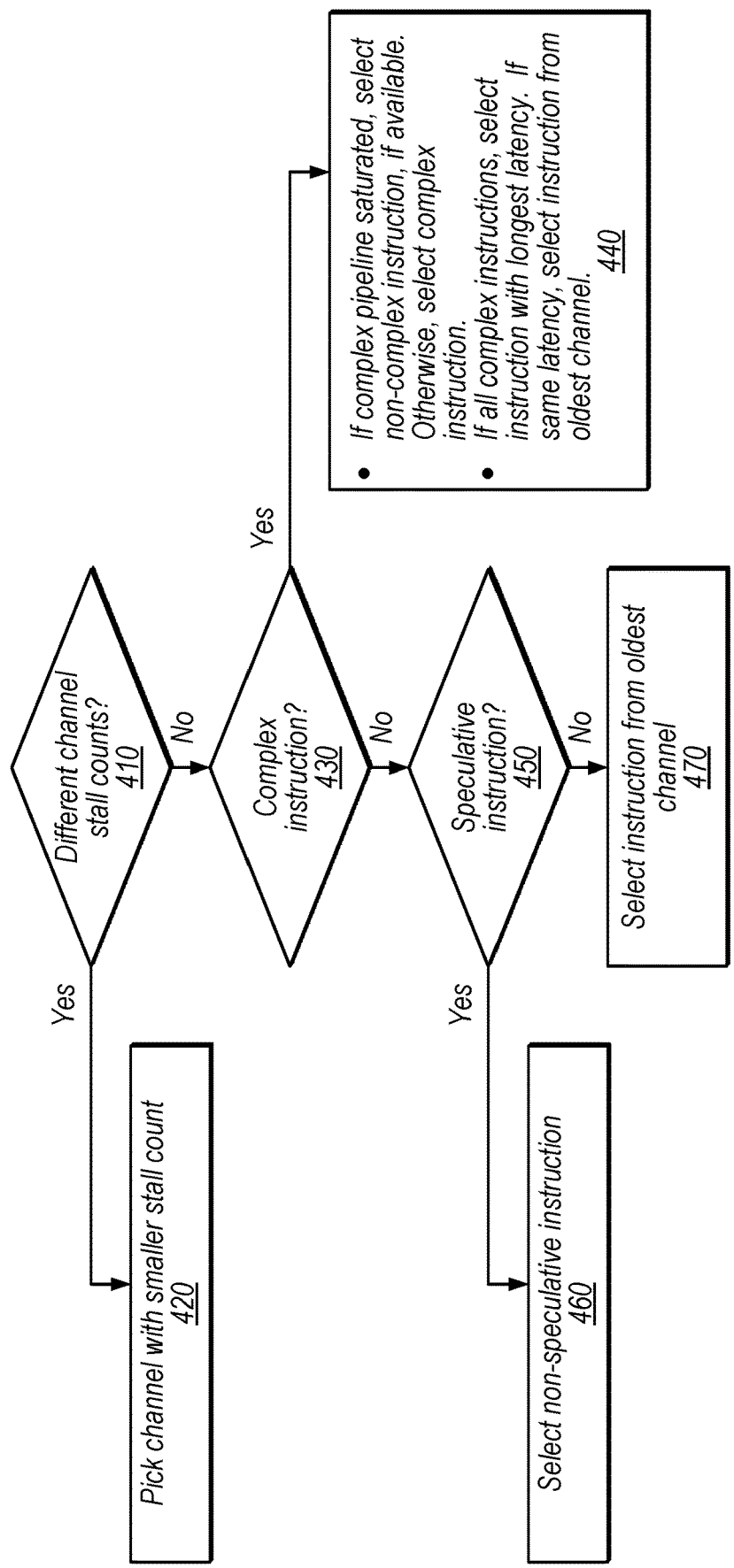
FIG. 4 is a flow diagram illustrating an example technique for selecting an instruction from multiple SIMD groups, according to some embodiments.

Arbitration circuitry 220 controls MUX 330, in the illustrated embodiment, to select from among available instructions from the different channels. FIG. 4, discussed below, provides a detailed example selection procedure performed by arbitration circuitry 220 in some embodiments. Information regarding operand locations of the selected instruction is sent to operand fetch circuitry 365, which may facilitate reading input operands into the register file 360, if needed. The pipeline may stall the unselected channel and may reduce the stall count of the waiting operation for that channel.

Park stage(s) 335, in the illustrated embodiment, is configured to queue operations, e.g., to give time to for data to be returned. Park stages 335 are implemented as a FIFO structure in some embodiments.

Operand cache load stage 340, in the illustrated embodiment, is configured to load input operands into allocated operand cache entries.

Issue stage 345, in the illustrated embodiment, is configured to issue operations to the appropriate execution unit. Issue stage 345 may stall instructions based on their stall counts to avoid hazards, if needed.

Execution stages 350, in the illustrated embodiments, are configured to perform received operations over one or more cycles. In some embodiments, execution stages 350 include multiple execution pipelines for different types of operations and different types of operations may use different numbers of stages/cycles to produce a result. Execution stages 350 may access operands in operand cache 355 and may generate a result that may be cached in operand cache 355, forwarded, written to register file 360, etc. In some embodiments, the processor includes an integer execution unit, multiple floating point execution units (e.g., for different precisions such as 16-bit and 32-bit), and a unit configured to execute a subset of operation types (e.g., that are pre-identified as complex operations).

Operand cache 355 may be implemented using various caching structures. Example embodiments of operand caches are described in U.S. Pat. No. 9,785,567 issued Oct. 10, 2017. In other embodiments, the operand cache may be omitted and operands may be accessed in register file 360.

Example Arbitration Technique and Circuitry

FIG. 4 is a flow diagram illustrating an example arbitration technique implemented by arbitration circuitry 220, according to some embodiments. The method shown in FIG. 4 may be used in conjunction with any of the computer circuitry, systems, devices, elements, or components disclosed herein, among others. In various embodiments, some of the method elements shown may be performed concurrently, in a different order than shown, or may be omitted. Additional method elements may also be performed as desired.

At 410, in the illustrated embodiment, arbitration circuitry 220 determines whether the operations from the different channels have different stall counts. If so, arbitration circuitry picks the channel with the smaller stall count at 420. As discussed above, the stall count may be determined based on dependency detection circuitry. Selecting the channel with the smaller stall count may reduce pipeline bubbles inserted at the issue stage.

At 430, in the illustrated embodiment, arbitration circuitry 220 determines whether there is a complex instruction (or, more generally an instruction that targets a particular type of execution unit). If so, flow proceeds to 440. In some embodiments, the complex unit operates at a lower rate than the other units (e.g., ½ rate or ¼ rate). In these embodiments, sending too many operations to the complex unit may cause stalls. Therefore, the processor may track the number of cycles needed for outstanding complex instructions (e.g., using a lookup table that specifies the number of cycles for each type of complex instruction). The processor may also track the number of cycles needed for all outstanding instructions for both channels. Decode units 310, for example, may determine the cycle counts. In some embodiments, the processor may determine that the complex unit is saturated when a cycle count for in-flight complex operations meets a threshold ratio relative to the overall cycle count. Speaking generally, in various embodiments, various techniques may be used to determine whether a particular type of execution unit has more than a threshold amount of work pending in the pipeline.

At 440, in the illustrated embodiments, arbitration circuitry 220 selects a non-complex instruction if the complex unit is saturated. If the complex unit is determined not to be saturated based on in-flight instructions, the arbitration circuitry 220 selects the channel with the complex instruction. If both channels have complex instructions, arbitration circuitry 220 selects the instruction with the longest execution latency. If both channels have complex instructions with the same execution latency, arbitration circuitry 220 selects the instruction from the oldest channel. For example, in some embodiments, the processor tracks ages of SIMD groups based on when they are dispatched. In this example, if SIMD group X is older than SIMD group Y, the next instruction for both SIMD groups is a complex instruction and the next instruction from both SIMD groups has the same execution latency, arbitration circuitry 220 may select the instruction from SIMD group X.

At 450, in the illustrated embodiment, arbitration circuitry 220 determines whether there is a speculative instruction waiting. If so, flow proceeds to 460 and arbitration circuitry selects the channel with the non-speculative instruction. Instructions may be speculatively executed for various reasons, and it is unknown whether the results of an instruction that is currently being speculatively executed will actually be used. As one example, predicated execution may selectively disable threads and may do so conditionally based on older instructions. While the conditional instructions are in-flight, it is unknown whether younger instructions will be predicated off, and these younger instructions may be executed speculatively. Speculatively executed instructions that should not have executed will have their results discarded, in some embodiments.

At 470, in the illustrated embodiment, arbitration circuitry 220 selects the instruction from the oldest channel. Note that FIG. 4 shows a detailed example of arbitration logic for purposes of illustration, but this example is not intended to limit the scope of the present disclosure (although this example may provide substantial improvements for certain processor designs and workloads). In other embodiments, arbitration logic may generate output signals based on various combinations of all or a subset of the disclosed inputs and may also consider other inputs. Further, some of the decision blocks of FIG. 4 are based on a two-channel implementation such as the example of FIG. 3, but arbitration circuitry 220 may implement similar logic for larger numbers of channels that share execution circuitry, in some embodiments.

Figure 5:
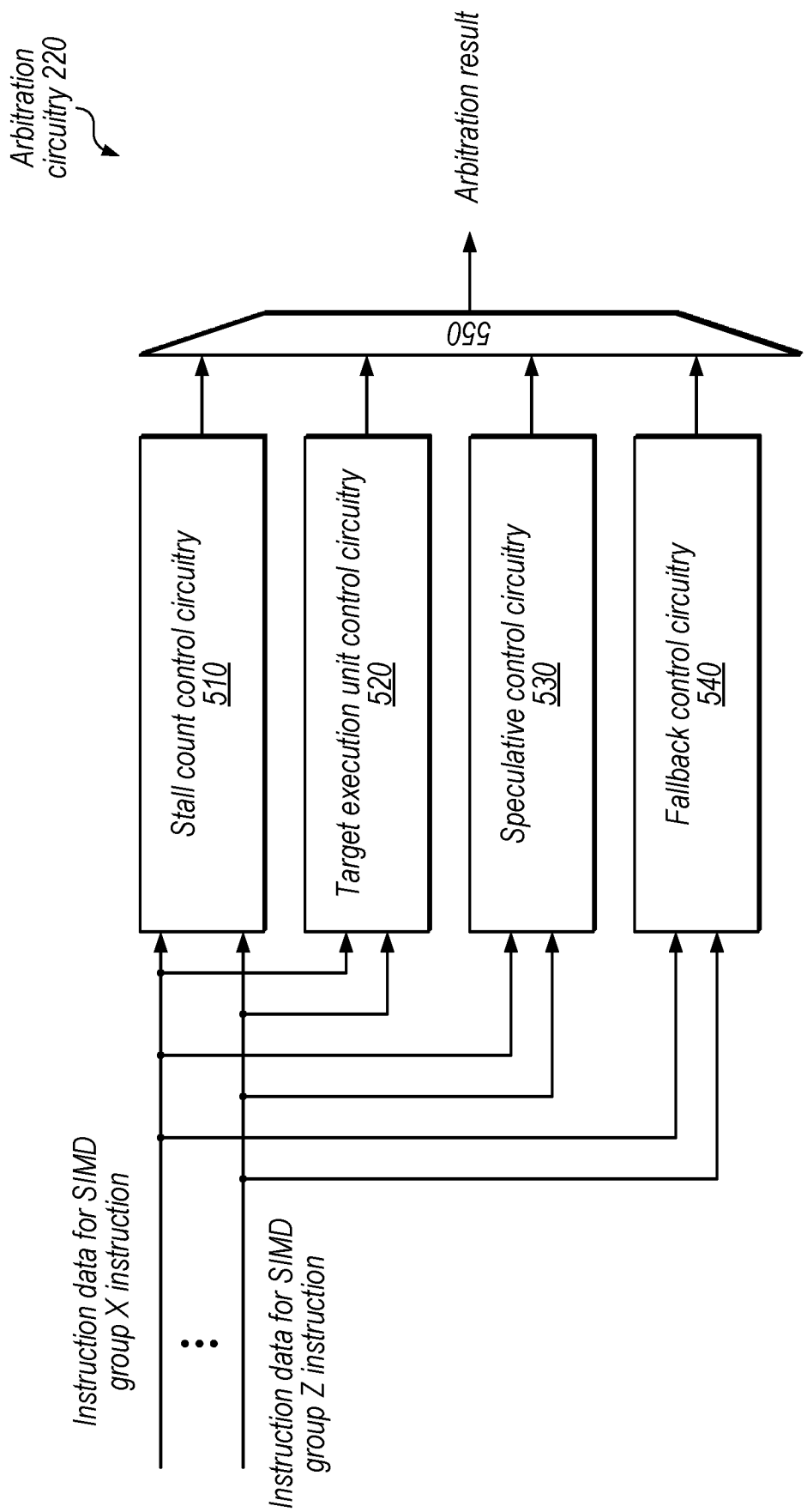
FIG. 5 is a block diagram illustrating example arbitration circuitry, according to some embodiments.

FIG. 5 is a block diagram illustrating example arbitration circuitry, according to some embodiments. In some embodiments, the illustrated circuitry is configured to perform the technique of FIG. 4. In the illustrated embodiment, arbitration circuitry 220 includes stall count control circuitry 510, target execution unit control circuitry 520, speculative control circuitry 530, fallback control circuitry 540, and MUX 550. In the illustrated embodiment, the different types of arbitration control circuitry receive instruction data, (e.g., for the next waiting instruction) from each of multiple SIMD groups X-Z. The different types of control circuitry may receive different types of information about waiting instructions. For example, stall count control circuitry 510 may receive stall counts while fallback control circuitry 540 may receive SIMD group age information.

In the illustrated embodiment, the arbitration circuitry 220 is configured to perform multiple checks at least partially in parallel and then control MUX 550 to generate an arbitration result (for which control signaling is not explicitly shown). For example, each type of arbitration control circuitry may output a signal indicating whether it generated an arbitration decision in the current cycle and MUX control logic may generate a MUX control signal based on relative priorities of the different types of arbitration control circuitry. In other embodiments, different types of arbitration control circuitry may operate sequentially. In some embodiments, one or more types of arbitration circuitry may be powered down if another control circuit has already generated a final arbitration decision.

Stall count control circuitry 510, in some embodiments, is configured to select a channel with a smaller stall count if the channels have different stalls counts. Circuitry 510 may include a comparator and MUX, for example.

Target execution unit control circuitry 520, in some embodiments, is configured to determine whether instructions that target a specific execution unit are available (e.g., based on their op-code). Circuitry 520 may include a MUX controlled by a signal indicating whether the specific execution unit is saturated, to select a channel in situations where one of the channels targets the execution unit. Circuitry 520 may also include a comparator configured to determine the instruction with the lowest execution latency as a fallback.

Speculative control circuitry 530, in some embodiments, is configured to select non-speculative instructions, when available. Circuitry 530 may include an XOR gate, for example, that receives inputs indicating whether waiting instructions are speculative and may control a MUX based on one of the inputs to select a channel when the output of the XOR indicates that one of the instructions is speculative.

Fallback control circuitry 540, in some embodiments, is configured to select an instruction from an older channel. Fallback control circuitry 540 may include a comparator that receives age information for executed SIMD groups. As is well-understood by those of skill in the art, various different circuit implementations and topologies may be used to implement the arbitration techniques described herein. The disclosed example circuitry is included to provide specific examples for illustration, but is not intended to limit the scope of the present disclosure.

Example Method

Figure 6:
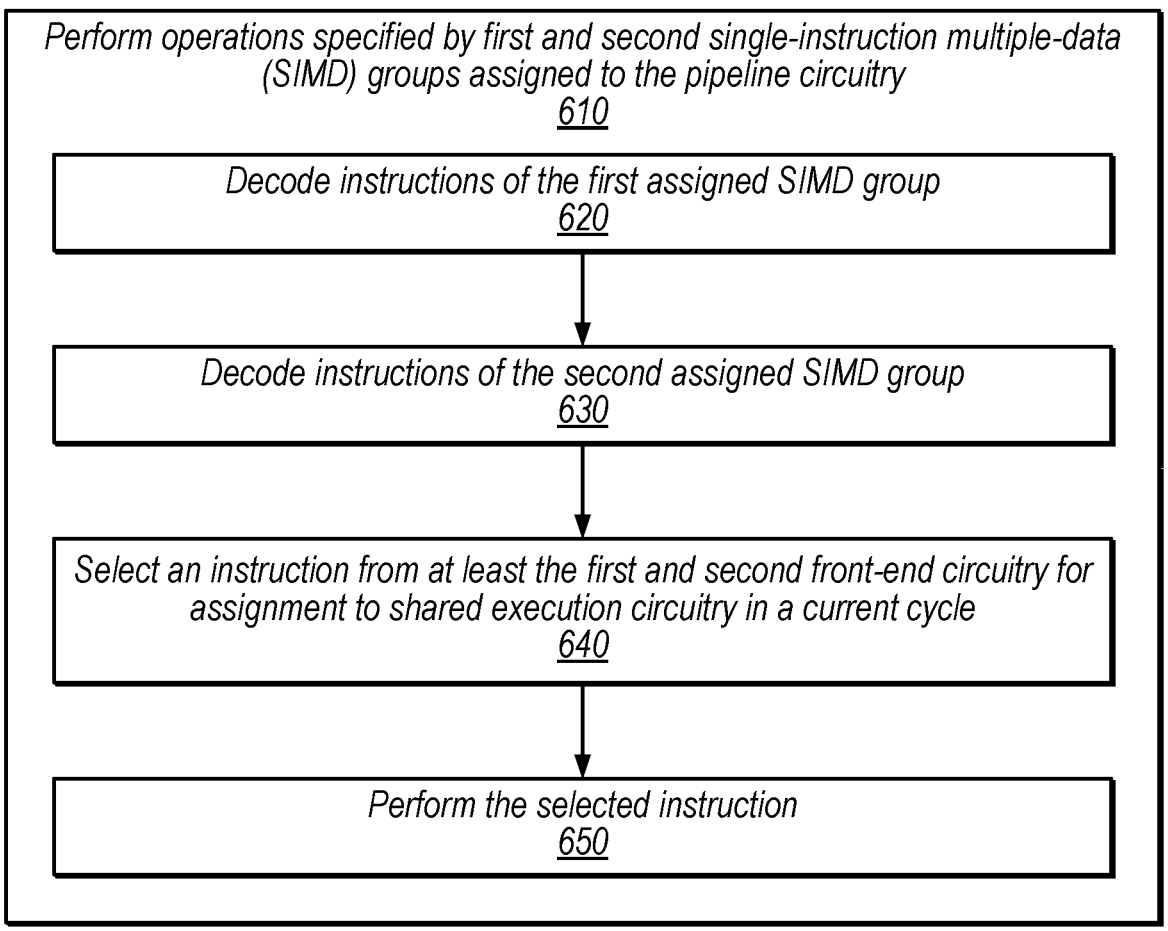
FIG. 6 is a flow diagram illustrating an example method, according to some embodiments.

FIG. 6 is a flow diagram illustrating an example method for using frame portion cost estimates, according to some embodiments. The method shown in FIG. 6 may be used in conjunction with any of the computer circuitry, systems, devices, elements, or components disclosed herein, among others. In various embodiments, some of the method elements shown may be performed concurrently, in a different order than shown, or may be omitted. Additional method elements may also be performed as desired.

At 610, in the illustrated embodiment, pipeline circuitry performs, operations specified by first and second single-instruction multiple-data (SIMD) groups assigned to the pipeline circuitry.

At 620, in the illustrated embodiment, first front-end circuitry decodes instructions of the first assigned SIMD group. At 630, in the illustrated embodiment, second front-end circuitry decodes instructions of the second assigned SIMD group. Elements 310-325 of FIG. 3 provide a non-limiting example of front-end circuitry. In some embodiments, the first and second front-end circuitry include respective hazard detection stages configured to generate stall counts based on detected hazards. The hazards may be detected based on contention for operand cache entries or registers, for example.

At 640, in the illustrated embodiment, arbitration circuitry selects an instruction from at least the first and second front-end circuitry for assignment to shared execution circuitry in a current cycle. In some embodiments, the arbitration circuitry is configured to select an instruction based on one or more of: stall counts for available instructions, whether available instructions are being speculatively executed, whether ones of available instructions target a particular portion of the shared execution circuitry, numbers of execution cycles for available instructions, and ages of available instructions.

In some embodiments, the arbitration circuitry includes first control circuitry (e.g., circuitry 510) configured to select, from among at least a first instruction from the first front-end circuitry and a second instruction from the second front-end circuitry, an instruction that has a smaller stall count. In some embodiments, the arbitration circuitry includes second control circuitry (e.g., circuitry 520) configured to, in the absence of a selection by the first control circuitry: based on a determination that the first instruction targets a particular execution unit and the second instruction does not target the particular execution unit, select from among the first and second instructions based on whether the particular execution unit is saturated. In some embodiments, the arbitration circuitry includes third control circuitry (e.g., circuitry 530) configured to, in the absence of a selection by the first and second control circuitry: select the first instruction based on a determination that the first instruction is not a speculative instruction and the second instruction is a speculative instruction. In some embodiments, the arbitration circuitry is configured to, in the absence of a selection by the first, second, and third control circuitry, select an instruction from an older SIMD group from among the first and second instructions.

At 650, in the illustrated embodiment, shared execution circuitry performs the selected instruction. Elements 335-350 of FIG. 3 provide a non-limiting example of shared execution circuitry.

In some embodiments, the first and second front-end circuitry include respective operand cache allocation stages and the shared execution circuitry includes an operand cache load stage, an issue stage, and a plurality of execution stages.

In various embodiments, the disclosed embodiments may advantageously reduce pipeline bubbles while maintaining fairness and performing for SIMD groups that share execution units.

Example Device

Figure 7:
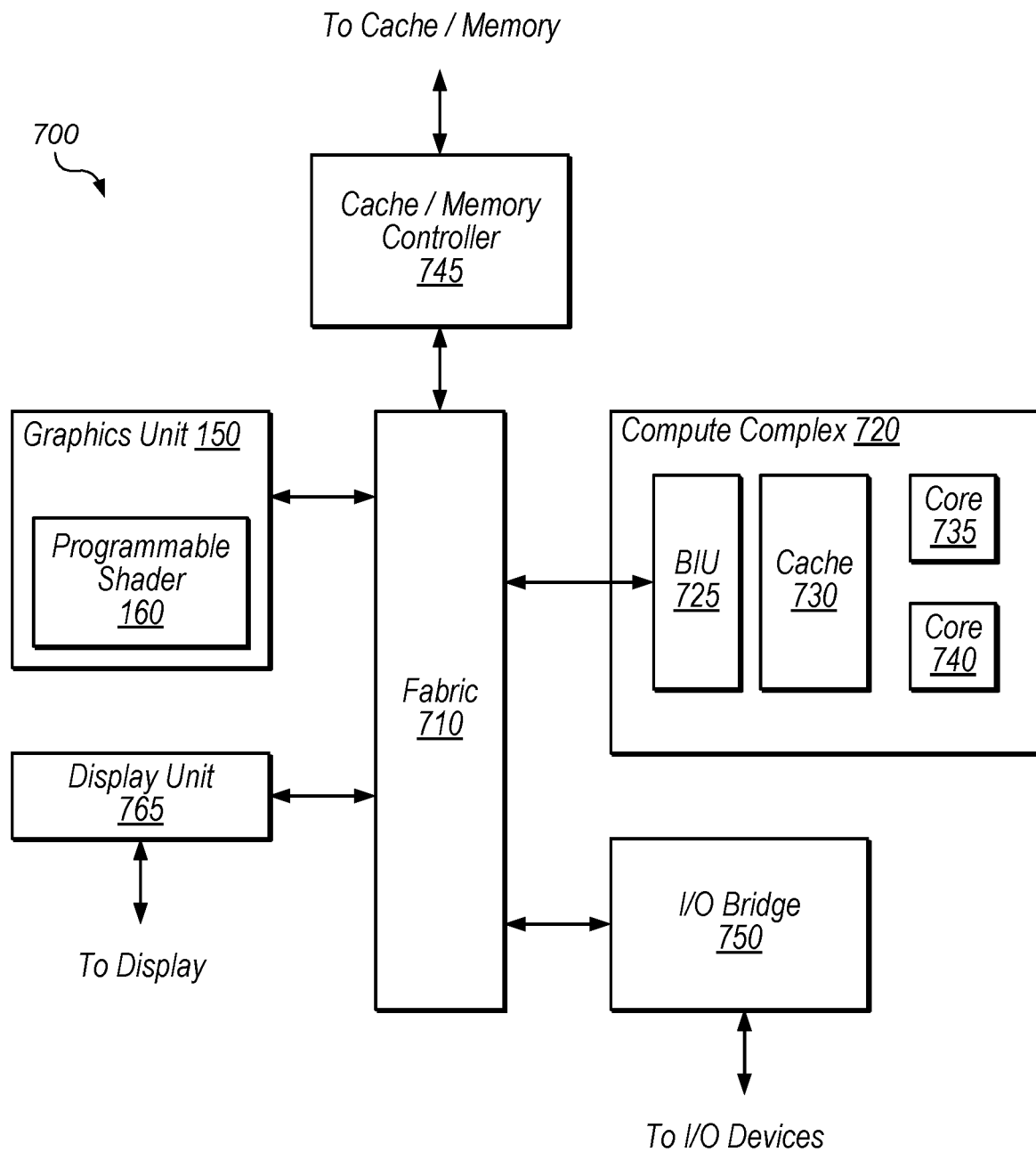
FIG. 7 is a block diagram illustrating an example computing device, according to some embodiments.

Referring now to FIG. 7, a block diagram illustrating an example embodiment of a device 700 is shown. In some embodiments, elements of device 700 may be included within a system on a chip. In some embodiments, device 700 may be included in a mobile device, which may be battery-powered. Therefore, power consumption by device 700 may be an important design consideration. In the illustrated embodiment, device 700 includes fabric 710, compute complex 720 input/output (I/O) bridge 750, cache/memory controller 745, graphics unit 150, and display unit 765. In some embodiments, device 700 may include other components (not shown) in addition to and/or in place of the illustrated components, such as video processor encoders and decoders, image processing or recognition elements, computer vision elements, etc.

Fabric 710 may include various interconnects, buses, MUX's, controllers, etc., and may be configured to facilitate communication between various elements of device 700. In some embodiments, portions of fabric 710 may be configured to implement various different communication protocols. In other embodiments, fabric 710 may implement a single communication protocol and elements coupled to fabric 710 may convert from the single communication protocol to other communication protocols internally.

In the illustrated embodiment, compute complex 720 includes bus interface unit (BIU) 725, cache 730, and cores 735 and 740. In various embodiments, compute complex 720 may include various numbers of processors, processor cores and/or caches. For example, compute complex 720 may include 1, 2, or 4 processor cores, or any other suitable number. In one embodiment, cache 730 is a set associative L2 cache. In some embodiments, cores 735 and/or 740 may include internal instruction and/or data caches. In some embodiments, a coherency unit (not shown) in fabric 710, cache 730, or elsewhere in device 700 may be configured to maintain coherency between various caches of device 700. BIU 725 may be configured to manage communication between compute complex 720 and other elements of device 700. Processor cores such as cores 735 and 740 may be configured to execute instructions of a particular instruction set architecture (ISA) which may include operating system instructions and user application instructions.

Cache/memory controller 745 may be configured to manage transfer of data between fabric 710 and one or more caches and/or memories. For example, cache/memory controller 745 may be coupled to an L3 cache, which may in turn be coupled to a system memory. In other embodiments, cache/memory controller 745 may be directly coupled to a memory. In some embodiments, cache/memory controller 745 may include one or more internal caches.

As used herein, the term "coupled to" may indicate one or more connections between elements, and a coupling may include intervening elements. For example, in FIG. 7, graphics unit 150 may be described as "coupled to" a memory through fabric 710 and cache/memory controller 745. In contrast, in the illustrated embodiment of FIG. 7, graphics unit 150 is "directly coupled" to fabric 710 because there are no intervening elements.

Graphics unit 150 may include one or more processors and/or one or more graphics processing units (GPU's). Graphics unit 150 may receive graphics-oriented instructions, such as OPENGL®, Metal, or DIRECT3D® instructions, for example. Graphics unit 150 may execute specialized GPU instructions or perform other operations based on the received graphics-oriented instructions. Graphics unit 150 may generally be configured to process large blocks of data in parallel and may build images in a frame buffer for output to a display. Graphics unit 150 may include transform, lighting, triangle, and/or rendering engines in one or more graphics processing pipelines. Graphics unit 150 may output pixel information for display images. Programmable shader 160, in various embodiments, may include highly parallel execution cores configured to execute graphics programs, which may include pixel tasks, vertex tasks, and compute tasks (which may or may not be graphics-related).

In some embodiments, graphics unit 150 includes the circuitry discussed herein. In other embodiments, the disclosed circuitry may be implemented in other types of processors, such as CPUs, for example.

Display unit 765 may be configured to read data from a frame buffer and provide a stream of pixel values for display. Display unit 765 may be configured as a display pipeline in some embodiments. Additionally, display unit 765 may be configured to blend multiple frames to produce an output frame. Further, display unit 765 may include one or more interfaces (e.g., MIPI® or embedded display port (eDP)) for coupling to a user display (e.g., a touchscreen or an external display).

I/O bridge 750 may include various elements configured to implement: universal serial bus (USB) communications, security, audio, and/or low-power always-on functionality, for example. I/O bridge 750 may also include interfaces such as pulse-width modulation (PWM), general-purpose input/output (GPIO), serial peripheral interface (SPI), and/or inter-integrated circuit (I2C), for example. Various types of peripherals and devices may be coupled to device 700 via I/O bridge 750.

Example Computer-Readable Medium

The present disclosure has described various example circuits in detail above. It is intended that the present disclosure cover not only embodiments that include such circuitry, but also a computer-readable storage medium that includes design information that specifies such circuitry. Accordingly, the present disclosure is intended to support claims that cover not only an apparatus that includes the disclosed circuitry, but also a storage medium that specifies the circuitry in a format that is recognized by a fabrication system configured to produce hardware (e.g., an integrated circuit) that includes the disclosed circuitry. Claims to such a storage medium are intended to cover, for example, an entity that produces a circuit design, but does not itself fabricate the design.

Figure 8:
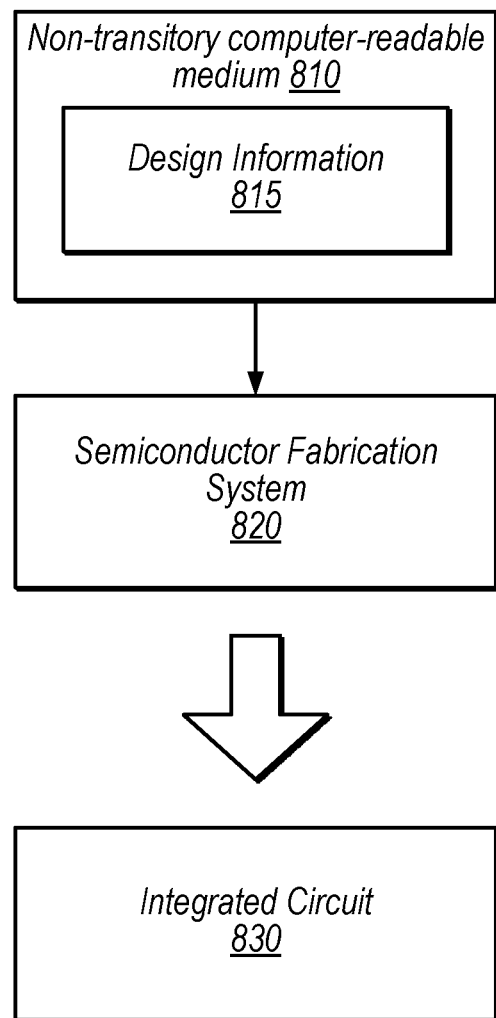
FIG. 8 is a block diagram illustrating an example computer-readable medium that stores circuit design information, according to some embodiments.

FIG. 8 is a block diagram illustrating an example non-transitory computer-readable storage medium that stores circuit design information, according to some embodiments. In the illustrated embodiment semiconductor fabrication system 820 is configured to process the design information 815 stored on non-transitory computer-readable medium 810 and fabricate integrated circuit 830 based on the design information 815.

Non-transitory computer-readable storage medium 810, may comprise any of various appropriate types of memory devices or storage devices. Non-transitory computer-readable storage medium 810 may be an installation medium, e.g., a CD-ROM, floppy disks, or tape device; a computer system memory or random access memory such as DRAM, DDR RAM, SRAM, EDO RAM, Rambus RAM, etc.; a non-volatile memory such as a Flash, magnetic media, e.g., a hard drive, or optical storage; registers, or other similar types of memory elements, etc. Non-transitory computer-readable storage medium 810 may include other types of non-transitory memory as well or combinations thereof. Non-transitory computer-readable storage medium 810 may include two or more memory mediums which may reside in different locations, e.g., in different computer systems that are connected over a network.

Design information 815 may be specified using any of various appropriate computer languages, including hardware description languages such as, without limitation: VHDL, Verilog, SystemC, SystemVerilog, RHDL, M, MyHDL, etc. Design information 815 may be usable by semiconductor fabrication system 820 to fabricate at least a portion of integrated circuit 830. The format of design information 815 may be recognized by at least one semiconductor fabrication system 820. In some embodiments, design information 815 may also include one or more cell libraries which specify the synthesis and/or layout of integrated circuit 830. In some embodiments, the design information is specified in whole or in part in the form of a netlist that specifies cell library elements and their connectivity. Design information 815, taken alone, may or may not include sufficient information for fabrication of a corresponding integrated circuit. For example, design information 815 may specify the circuit elements to be fabricated but not their physical layout. In this case, design information 815 may need to be combined with layout information to actually fabricate the specified circuitry.

Integrated circuit 830 may, in various embodiments, include one or more custom macrocells, such as memories, analog or mixed-signal circuits, and the like. In such cases, design information 815 may include information related to included macrocells. Such information may include, without limitation, schematics capture database, mask design data, behavioral models, and device or transistor level netlists. As used herein, mask design data may be formatted according to graphic data system (GDSII), or any other suitable format.

Semiconductor fabrication system 820 may include any of various appropriate elements configured to fabricate integrated circuits. This may include, for example, elements for depositing semiconductor materials (e.g., on a wafer, which may include masking), removing materials, altering the shape of deposited materials, modifying materials (e.g., by doping materials or modifying dielectric constants using ultraviolet processing), etc. Semiconductor fabrication system 820 may also be configured to perform various testing of fabricated circuits for correct operation.

In various embodiments, integrated circuit 830 is configured to operate according to a circuit design specified by design information 815, which may include performing any of the functionality described herein. For example, integrated circuit 830 may include any of various elements shown in FIG. 1B, 2, 3, 5, or 7. Further, integrated circuit 830 may be configured to perform various functions described herein in conjunction with other components. Further, the functionality described herein may be performed by multiple connected integrated circuits.

As used herein, a phrase of the form "design information that specifies a design of a circuit configured to . . . " does not imply that the circuit in question must be fabricated in order for the element to be met. Rather, this phrase indicates that the design information describes a circuit that, upon being fabricated, will be configured to perform the indicated actions or will include the specified components.

Although specific embodiments have been described above, these embodiments are not intended to limit the scope of the present disclosure, even where only a single embodiment is described with respect to a particular feature. Examples of features provided in the disclosure are intended to be illustrative rather than restrictive unless stated otherwise. The above description is intended to cover such alternatives, modifications, and equivalents as would be apparent to a person skilled in the art having the benefit of this disclosure.

The scope of the present disclosure includes any feature or combination of features disclosed herein (either explicitly or implicitly), or any generalization thereof, whether or not it mitigates any or all of the problems addressed herein. Accordingly, new claims may be formulated during prosecution of this application (or an application claiming priority thereto) to any such combination of features. In particular, with reference to the appended claims, features from dependent claims may be combined with those of the independent claims and features from respective independent claims may be combined in any appropriate manner and not merely in the specific combinations enumerated in the appended claims.

What is claimed is:

1. An apparatus, comprising:
pipeline circuitry configured to perform operations specified by instructions of first and second single-instruction multiple-data (SIMD) groups assigned to the pipeline circuitry, wherein the pipeline circuitry includes:
first front-end circuitry configured to decode instructions of the first assigned SIMD group;
second front-end circuitry configured to decode instructions of the second assigned SIMD group, wherein the first and second front-end circuitry are configured to decode an instruction of the first SIMD group and an instruction of the second SIMD group in parallel in a given cycle;
shared execution circuitry configured to perform operations specified by the first and second assigned SIMD groups; and
arbitration circuitry configured to select an instruction from among at least the first and second front-end circuitry for assignment to the shared execution circuitry in a current cycle, such that instructions from both the first SIMD group and the second SIMD group occupy different stages of the shared execution circuitry at a given time, wherein the selection is based on at least the following inputs:
stall counts for instructions from the first and second front-end circuitry;
whether execution units targeted by instructions from the first and second front-end circuitry are saturated; and
whether instructions from the first and second front-end circuitry are speculatively executed.

2. The apparatus of claim 1, wherein the arbitration circuitry is further configured to select an instruction based on one or more of the following types of information:
numbers of execution cycles for available instructions; and
ages of available instructions.

3. The apparatus of claim 1, wherein the arbitration circuitry includes first control circuitry configured to select, from among at least a first instruction from the first front-end circuitry and a second instruction from the second front-end circuitry, an instruction that has a smaller stall count.

4. The apparatus of claim 3, wherein the arbitration circuitry includes second control circuitry configured to, in the absence of a selection by the first control circuitry:
based on a determination that the first instruction targets a particular execution unit and the second instruction does not target the particular execution unit, select from among the first and second instructions based on whether the particular execution unit is saturated.

5. The apparatus of claim 4, wherein the arbitration circuitry includes third control circuitry configured to, in the absence of a selection by the first and second control circuitry:
select the first instruction based on a determination that the first instruction is not a speculative instruction and the second instruction is a speculative instruction.

6. The apparatus of claim 5, wherein the arbitration circuitry is configured to, in the absence of a selection by the first, second, and third control circuitry, select an instruction from an older SIMD group from among the first and second instructions.

7. The apparatus of claim 1, wherein the first and second front-end circuitry include respective hazard detection stages configured to generate stall counts based on detected hazards.

8. The apparatus of claim 1,
wherein the first and second front-end circuitry include respective operand cache allocation stages;
wherein the shared execution circuitry includes an operand cache load stage; and
wherein the shared execution circuitry includes an issue stage and a plurality of execution stages.

9. The apparatus of claim 1, wherein the shared execution circuitry includes a plurality of execution pipelines configured to execute different respective sets of instruction types.

10. The apparatus of claim 1, further comprising:
a central processing unit;
a graphics processor; and
network interface circuitry;
wherein the pipeline circuitry is included in at least one of the central processing unit or the graphics processor.

11. A non-transitory computer readable storage medium having stored thereon design information that specifies a design of at least a portion of a hardware integrated circuit in a format recognized by a semiconductor fabrication system that is configured to use the design information to produce the circuit according to the design, wherein the design information specifies that the circuit includes:
pipeline circuitry configured to perform operations specified by instructions of first and second single-instruction multiple-data (SIMD) groups assigned to the pipeline circuitry, wherein the pipeline circuitry includes:
first front-end circuitry configured to decode instructions of the first assigned SIMD group;
second front-end circuitry configured to decode instructions of the second assigned SIMD group, wherein the first and second front-end circuitry are configured to decode an instruction of the first SIMD group and an instruction of the second SIMD group in parallel in a given cycle;
shared execution circuitry configured to perform operations specified by the first and second assigned SIMD groups; and
arbitration circuitry configured to select an instruction from among at least the first and second front-end circuitry for assignment to the shared execution circuitry in a current cycle, such that instructions from both the first SIMD group and the second SIMD group occupy different stages of the shared execution circuitry at a given time, wherein the selection is based on at least the following inputs:
stall counts for instructions from the first and second front-end circuitry;
whether execution units targeted by instructions from the first and second front-end circuitry are saturated; and
whether instructions from the first and second front-end circuitry are speculatively executed.

12. The non-transitory computer readable storage medium of claim 11, wherein the arbitration circuitry is further configured to select an instruction based on:
whether ones of available instructions target a particular portion of the shared execution circuitry;
numbers of execution cycles for available instructions; and
ages of available instructions.

13. The non-transitory computer readable storage medium of claim 11, wherein the arbitration circuitry includes first control circuitry configured to select, from among at least a first instruction from the first front-end circuitry and a second instruction from the second front-end circuitry, an instruction that has a smaller stall count; and
wherein the arbitration circuitry includes second control circuitry configured to, in the absence of a selection by the first control circuitry and based on a determination that the first instruction targets a particular execution unit and the second instruction does not target the particular execution unit, select from among the first and second instructions based on whether the particular execution unit is saturated.

14. The non-transitory computer readable storage medium of claim 13, wherein the arbitration circuitry includes third control circuitry configured to, in the absence of a selection by the first and second control circuitry, select the first instruction based on a determination that the first instruction is not a speculative instruction and the second instruction is a speculative instruction; and
wherein the arbitration circuitry is configured to, in the absence of a selection by the first, second, and third control circuitry, select an instruction from an older SIMD group from among the first and second instructions.

15. The non-transitory computer readable storage medium of claim 11, wherein the first and second front-end circuitry include respective hazard detection stages configured to generate stall counts.

16. A method, comprising:
performing, by pipeline circuitry, operations specified by first and second single-instruction multiple-data (SIMD) groups assigned to the pipeline circuitry, wherein the performing includes:
decoding, by first front-end circuitry, instructions of the first assigned SIMD group;
decoding, by second front-end circuitry, instructions of the second assigned SIMD group, including decoding an instruction of the first SIMD group and an instruction of the second SIMD group in parallel in a given cycle;
selecting, by arbitration circuitry, an instruction from at least the first and second front-end circuitry for assignment to shared execution circuitry in a current cycle, such that instructions from both the first SIMD group and the second SIMD group occupy different stages of the shared execution circuitry at a given time, wherein the selecting is based on at least the following inputs:
stall counts for instructions from the first and second front-end circuitry;
whether execution units targeted by instructions from the first and second front-end circuitry are saturated; and
whether instructions from the first and second front-end circuitry are speculatively executed; and
performing, by the shared execution circuitry, the selected instruction.

17. The method of claim 16, wherein the selecting is based on whether ones of available instructions target a particular portion of the shared execution circuitry.

18. The method of claim 16, wherein the selecting is further based on the following types of information:

numbers of execution cycles for available instructions; and ages of available instructions.

\* \* \* \* \*